(12) United States Patent
Chartre et al.

(10) Patent No.: US 7,180,866 B1
(45) Date of Patent: Feb. 20, 2007

(54) REROUTING IN CONNECTION-ORIENTED COMMUNICATION NETWORKS AND COMMUNICATION SYSTEMS

(75) Inventors: Denis Chartre, Kanata (CA); Jack Zgierski, Ottawa (CA); Darren Newell, Kanata (CA); Richard Stephens, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1033 days.

(21) Appl. No.: 10/192,498

(22) Filed: Jul. 11, 2002

(51) Int. Cl.
*G01R 31/08* (2006.01)

(52) U.S. Cl. ............... 370/242; 370/216; 370/401; 370/256

(58) Field of Classification Search ............... None
See application file for complete search history.

(56) References Cited

U.S. PATENT DOCUMENTS

| | | | |
|---|---|---|---|
| 6,115,753 A * | 9/2000 | Joens | 709/242 |
| 6,141,325 A * | 10/2000 | Gerstel | 370/238 |
| 6,594,235 B1 * | 7/2003 | Rochberger et al. | 370/238 |
| 6,690,653 B1 * | 2/2004 | Anbiah et al. | 370/256 |
| 6,735,176 B1 * | 5/2004 | So | 370/237 |
| 2004/0139150 A1 * | 7/2004 | McCanne et al. | 709/202 |

\* cited by examiner

*Primary Examiner*—Duc Ho
(74) *Attorney, Agent, or Firm*—Jeffrey M Measures; Borden Ladner Gervais LLP

(57) ABSTRACT

A Private Network-Network Interface (PNNI) network including interconnected nodes is defined as a single rerouting domain ("global domain") and the global domain is further defined by multiple divided domains ("local domains"). Each of the local domains is defined to include multiple nodes that are included in the network. Connection recovery and path optimization in the global domain (the entire PNNI network) are performed in accordance with a global rerouting protocol. The global rerouting protocol is a modification of the standard Domain-Based Rerouting (DBR) protocol, by adding information elements of domain identifier, rerouting for the global domain. The DBR protocol does not support the connection recovery from a link failure between local domains ("inter-domains") and the global path optimization. The global rerouting method is capable of connection recovery and path optimization outside of any rerouting local domains. The global rerouting provides double fault recovery within the rerouting domain ("intra-domain") as covered by the DBR and outside of the domains ("inter-domain") or when the initial fault recovery within the domain has failed. Also, the global rerouting method provides maximum path optimization across all domains and within the rerouting local domain.

49 Claims, 7 Drawing Sheets

| DESCRIPTION | OCTET |
|---|---|
| REROUTING SERVICES INFORMATION ELEMENT (IE) IDENTIFIER | 1 |
| IE INSTRUCTION FIELD | 2 |
| LENGTH OF REROUTING SERVICE | 3, 4 |
| INTER-DOMAIN SERVICES/CAPABILITIES | 5, 6 |
| INTRA-DOMAIN SERVICES/CAPABILITIES | 7, 8 |
| GLOBAL REROUTING OCTET IDENTIFIER | 9 |
| GLOBAL REROUTING OCTET LENGTH | 10 |
| GLOBAL INTRA-DOMAIN SERVICES/CAPABILITIES | 11, 12 |

| DESCRIPTION | OCTET |
| --- | --- |
| REROUTING INFORMATION ELEMENT (IE) IDENTIFIER | 1 |
| IE INSTRUCTION FIELD | 2 |
| LENGTH OF REROUTING IE | 3, 4 |
| EDGE NODE IDENTIFIER | 5*, 5.1 TO 5.21 |
| ENDPOINT KEY IDENTIFIER | 6*, 6.1 TO 6.5 |
| REROUTING CONTROL IDENTIFIER | 7*, 7.1 TO 7.4 |
| FOWARD CELL TRANSFER DELAY IDENTIFIER | 8*, 8.1 TO 8.4 |
| FORWARD PEAK-TO-PEAK CELL DELAY VARIATION IDENTIFIER | 9*, 9.1 TO 9.4 |
| BACKWARD PEAK-TO-PEAK CELL DELAY VARIATION IDENTIFIER | 10*, 10.1 TO 10.4 |
| GLOBAL EDGE NODE IDENTIFIER | 11*, 11.1 TO 11.4 |
| GLOBAL ENDPOINT KEY IDENTIFIER | 12*, 12.1 TO 12.5 |
| GLOBAL REROUTING CONTROL IDENTIFIER | 13*, 13.1 TO 13.4 |
| GLOBAL FORWARD CELL TRANSFER DELAY IDENTIFIER | 14*, 14.1 TO 14.4 |
| GLOBAL FORWARD PEAK-TO-PEAK CELL DELAY VARIATION IDENTIFIER | 15*, 15.1 TO 15.4 |
| GLOBAL BACKWARD PEAK-TO-PEAK CELL DELAY VARIATION IDENTIFIER | 16*, 16.1 TO 16.4 |

Octets 1–10 are grouped as DBR; octets 11–16 are grouped as GLOBAL.

FIG. 5

| DESCRIPTION | OCTET |
|---|---|
| REROUTING CAUSE CODE ELEMENT IDENTIFIER | 1 |
| IE INSTRUCTION FIELD | 2 |
| LENGTH OF REROUTING SERVICE | 3, 4 |
| REROUTING CAUSE CODE VALUE | 5 |

REROUTING IN CONNECTION-ORIENTED COMMUNICATION NETWORKS AND COMMUNICATION SYSTEMS

TECHNICAL FIELD

The present invention relates generally to rerouting in connection-oriented communication networks and in particular to rerouting for connection recovery and path optimization in connection-oriented networks, for example, Asynchronous Transfer Mode (ATM) and Multi-Protocol Label-Switching (MPLS) networks. The present invention is also applicable to the connection recovery from a failure in Time Division Multiplexed (TDM) and Optical networks.

BACKGROUND INFORMATION

Through the efforts of the ATM Forum, a protocol standard that enables the building of multivendor, interoperable ATM switching networks has been developed. The protocol standard relates to ATM connections within the Private Network-Network Interface (PNNI) domain. The protocol allows for the building and maintenance of large ATM networks because it provides hierarchical, dynamic link-state routing instructions and communication pathways. The PNNI routing is based on well-known, link-state routing techniques. The PNNI provides support for quality of service (QoS) routing required for applications with real-time requirements and scalability to large global networks. These features provide large-scale networks with a single routing protocol. In these environments, rerouting refers to changing the call path of an existing call connection anywhere between its two end-points (i.e., the source and the destination). No user signaling is needed to reestablish the connection as the operation is performed by the network. This permits the calling and called parties to be continuously connected. In accordance with known signaling procedures, in the event of a network failure, the connection is rerouted within the PNNI domain, i.e., between the two user-to-network interfaces (UNI) connecting the calling and called party.

The PNNI network may be organized into one or more rerouting domains, with each node potentially belonging to at most one rerouting domain. The Domain-based Rerouting (DBR) standard defines connection recovery and path optimization procedures within the context and scope of each rerouting domain (termed the local rerouting services). The connection recovery provides protection from a link failure ("fault protection") and connection segment release containment and recovery within the rerouting domain, thereby ensuring that the overall connection remains in the connected state. Only minimal cell loss on the data or call path is incurred as a result of connection recovery. Also, the path optimization ensures maximum use of network resources and bandwidth by allowing an existing connection to optimize onto a better or desirable path without the overall connection being released.

However, in the networks supported by the DBR standards, when a connection recovery fails within a rerouting domain locally, the connection will be released. Therefore, current best behavior by the nodes is to release the connection and attempt connection setup again. However, the end user's are impacted by being disconnected. Likewise, when a network resource that is not part of a rerouting domain fails, the connection is released. It is possible to ensure all network resources are protected by a rerouting domain, however in this case such resources are only singly protected. Therefore, it is preferable that all resources are doubly protected. Also, according to the DBR procedure, when path optimization is attempted, resources outside of the rerouting domain are ignored. It is possible to ensure the entire network is a single rerouting domain. This will, however, impact connection recovery in large networks where the connection recovery service is made scalable by dividing the network into separate rerouting domains.

SUMMARY OF THE INVENTION

In an illustrative embodiment of the present invention, a Private Network-Network Interface (PNNI) network including interconnected nodes is defined as a single rerouting domain ("global domain") and the global domain is further defined by multiple divided domains ("local domains"). Each of the local domains is defined to include multiple nodes that are included in the network. Connection recovery and path optimization in the global domain (the entire PNNI network) are performed in accordance with a global rerouting protocol. In a specific implementation example, the global rerouting protocol is a modification of the standard Domain-Based Rerouting (DBR) protocol, by adding information elements of domain identifier, rerouting for the global domain. The method and systems of the present invention provide global rerouting of a connection and path optimization outside of any rerouting local domains. The global rerouting provides double fault recovery within the rerouting domain ("intra-domain") as covered by the DBR and outside of the domains ("inter-domain") or when the initial fault recovery within the domain has failed.

In accordance with one aspect of the present invention, there is provided a method of rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said method comprising: detecting a request to reroute a first section of the path of the connection in a reroute domain, wherein said reroute domain is one of either the first domain or one of the plurality of second domains; determining a new first section for the path in said reroute domain; determining if the connection can be established along the path through said new first section; and requesting rerouting of the connection along a second section of the path in the other of either the first domain or one of the plurality of second domains when the connection along the path through said new first section is not established.

In accordance with another aspect of the present invention, there is provided a method of rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said method comprising the steps of: step for detecting an event indicating a cause to reroute a first section of the path of the connection in a first reroute domain, wherein said first reroute domain is one of either the first domain or one of the plurality of second domains; step for determining a new first section for the path in said first reroute domain; step for determining if the connection can be established along the path through said new first section; and step for rerouting the connection along a second section of the path in a second reroute domain when the connection along the path through said new first section is not established, wherein said second reroute domain is the other or either the first domain or one of the plurality of second domains.

In accordance with another aspect of the present invention, there is provided a method of rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said method comprising: detecting an event associated with the path and the connection; generating a reroute request upon detection of said event, said request being associated with an identifier information element; determining a new path for the connection in accordance with said identifier element; and establishing the new path for the connection wherein the originating node and the terminating node remain connected.

In accordance with another aspect of the present invention, there is provided a system for rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said system comprising: means for detecting a request to reroute a first section of the path of the connection in a reroute domain, wherein said reroute domain is one of either the first domain or one of the plurality of second domains; means for determining a new first section for the path in said reroute domain; means for determining if the connection can be established along the path through said new first section; and means for requesting rerouting of the connection along a second section of the path in the other of either the first domain or one of the plurality of second domains when the connection along the path through said new first section is not established.

In accordance with another aspect of the present invention, there is provided a system for rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said system comprising: an event detection mechanism for detecting a request to reroute a first section of the path of the connection in a reroute domain, wherein said reroute domain is one of either the first domain or one of the plurality of second domains; a domain routing determination mechanism for determining a new first section for the path in said reroute domain; a connection control mechanism for determining if the connection can be established along the path through said new first section; and a fail action mechanism for requesting rerouting of the connection along a second section of the path in the other of either the first domain or one of the plurality of second domains when the connection along the path through said new first section is not established.

In accordance with another aspect of the present invention, there is provided a computer readable medium having stored thereon computer-executable instructions for rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said computer-executable instructions comprising: detecting a request to reroute a first section of the path of the connection in a reroute domain, wherein said reroute domain is one of either the first domain or one of the plurality of second domains; determining a new first section for the path in said reroute domain; determining if the connection can be established along the path through said new first section; and requesting rerouting of the connection along a second section of the path in the other of either the first domain or one of the plurality of second domains when the connection along the path through said new first section is not established.

In accordance with another aspect of the present invention, there is provided a computer readable medium having stored thereon computer-executable instructions for rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said computer-executable instructions comprising the steps of: step for detecting an event indicating a cause to reroute a first section of the path of the connection in a first reroute domain, wherein said first reroute domain is one of either the first domain or one of the plurality of second domains; step for determining a new first section for the path in said first reroute domain; step for determining if the connection can be established along the path through said new first section; and step for rerouting the connection along a second section of the path in a second reroute domain when the connection along the path through said new first section is not established, wherein said second reroute domain is the other or either the first domain or one of the plurality of second domains.

BRIEF DESCRIPTION OF THE DRAWINGS

Examples of the present invention will now be described in relating to the accompanied drawings in which:

FIG. 5 shows an example structure of rerouting information elements for supporting another global rerouting protocol;

DETAILED DESCRIPTION

I. Edge-Based Rerouting (EBR)

Figure 1:
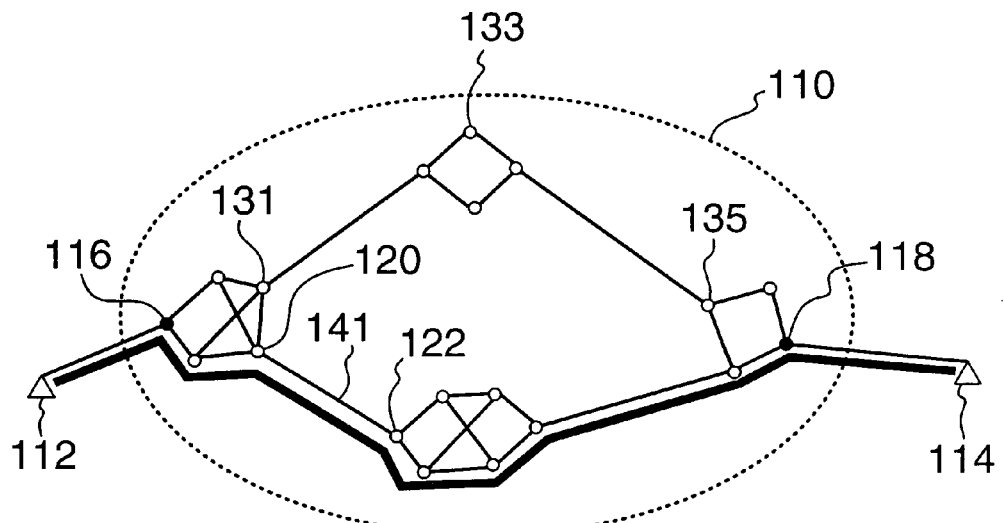
FIG. 1 illustrates known Edge-Based Rerouting (EBR) implementation in the PNNI network.

FIG. 1 illustrates an example of a known Edge-Based Rerouting (EBR) implementation based on a known ATM Forum EBR specification. In FIG. 1, an EBR rerouting domain 110 encompasses the PNNI network including multiple ATM communication nodes. The multiple nodes are defined inside the boundary of the rerouting domain 110, so as that the EBR protocol allows call recovery and path optimization inside the boundary. The nodes are interconnected by respective routing links. For example, each link is basically a communication channel or circuit which defines a topological relationship between two nodes connected thereby. A source customer premise equipment (CPE) 112 originates a call connection with the network at an edge node 116 ("originator") to another edge node 118 ("terminator") to establish a call path to a destination CPE 114 through other edge nodes (e.g., nodes 120 and 122).

Each of the nodes includes a connection admission control (CAC) component. The CAC component is defined as a set of actions taken by the network during a call setup or call re-negotiation phase: i.e., establishing a connection between the source CPE 112 and the destination CPE 114. To process a connection request made by the source CPE 12, the CAC component receives a number of input parameters, which are a route selection, a traffic descriptor (e.g., Peak Cell Rate (PCR), Sustainable Cell Rate (SCR), Maximum Burst Size (MBS)), link capacity, allocated capacity, and quality of service requirements (e.g., ATM Quality of Service (QoS)), among others. These input parameters are processed by the CAC component of the node for route selection and to determine whether a connection request made by the CPE 12 can be accepted or should be rejected. In the event of a link failure, release messages are sent to the neighbor edge nodes which in turn attempt to re-route the failed connections by calculating new routes with enough capacity/QoS.

This is connection recovery protocol and the rerouting method is performed in the network defined by the EBR rerouting domain 110. Here, the edge nodes 116, 118 and 120 behave as a "rerouting node", "rendezvous node" and a "transit node" of the EBR rerouting domain 110, respectively, in accordance with the EBR protocol. As a result, a call path between the source CPE 112 and the destination CPE 114 is established through the nodes 116, 120, 122 and 118 with intermediate nodes, as shown by the thickest line. Once established, this call path is an existing path.

As shown in FIG. 1, the EBR implementation defines one rerouting domain 110 from a designated transit list (DTL) originator to a DTL terminator (end-to-end). Therefore, the EBR implementation only supports one rerouting domain that includes the entire PNNI network. The established call path (the existing path) may be required to be switched to another call path (i.e., rerouting through a replacement path) for events associated with the established path. The events are, for example, connection recovery from a link failure and switching to a desirable connection path, the rerouting. In the network shown in FIG. 1, in an occurrence of a failure of a link 141 interconnecting the nodes 120 and 122, a path may be switched to a replacement path between the nodes 116 and 118 through nodes 131, 133 and 135. Similarly, due to path optimization, the existing path may be switched to the replacement path. The connection recovery and path optimization times increase with the size of the network. As the network size increases so does the use of the network resources for connection recovery and path optimization.

II. Domain-Based Rerouting (DBR)

The Domain-Based Rerouting (DBR) protocol is a standard based protocol, which uses standardized information elements (IEs). A concept in the DBR protocol is based on multiple DBR rerouting domains. The major difference between the DBR and EBR protocols is that in the DBR protocol, a connection registered with the rerouting protocol may traverse multiple DBR rerouting domains before reaching the DTL terminator, as shown in FIG. 2 wherein the PNNI network includes multiple DBR rerouting domains.

Figure 2:
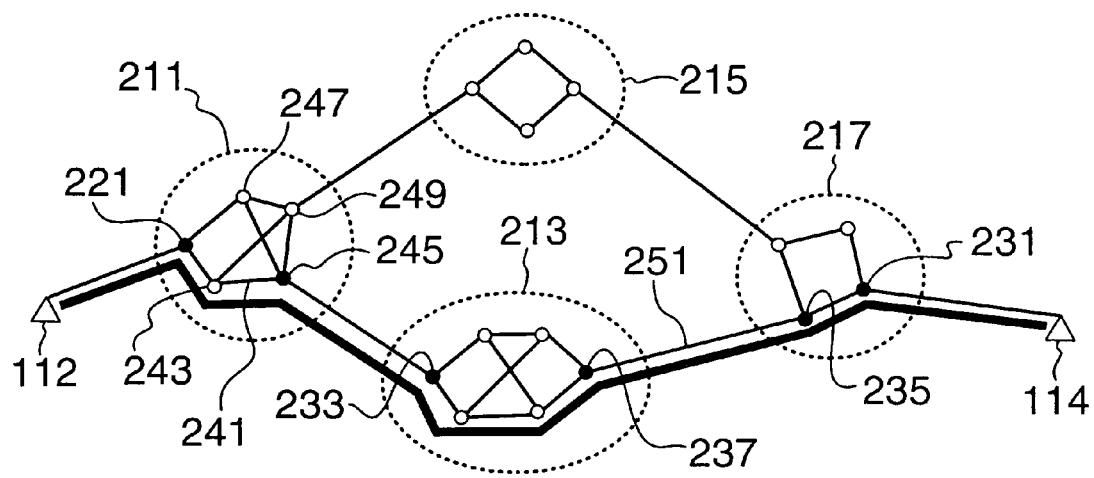
FIG. 2 illustrates known Domain-Based Rerouting (DBR) implementation in the PNNI network.

In FIG. 2, the PNNI network is defined by four DBR rerouting domains as example. Each of the DBR rerouting (local) domains 211, 213, 215 and 217 is defined by multiple DBR domain nodes therein. Each of the DBR rerouting domains 211, 213, 215 and 217 manages the rerouting functionality (of connection recovery and path optimization) within that DBR domain. Each connection segment within a DBR domain behaves as an independent connection.

At the present time, the DBR domain is not tied to the PNNI topology. Multiple DBR rerouting domains may exist inside a single PNNI peer group. Alternatively, a DBR rerouting domain may include multiple PNNI peer groups. The policies of where to define the DBR rerouting domain boundaries are under the control of a network operator. Each DBR domain node inside a DBR rerouting domain is interconnected to other nodes in that DBR domain by more than one link. Thus, multiple paths exist to each DBR domain edge node. This ensures an adequate diversity of routes for connection recovery and path optimization. Also, DBR domains may be defined to maximize visibility of the physical PNNI (H-PNNI) topology to each potential local rerouting node. In this way the local rerouting node makes better route selections.

The DBR protocol adds a new characteristic to a PNNI link, which is the DBR domain link type. This characteristic identifies whether the neighbor node is part of the same DBR domain or not. If the link is an "intra-domain link" then the PNNI neighbor is part of the same DBR domain. If the link is an "inter-domain link" then the PNNI neighbor is part of another DBR domain. Thus, with IEs representing inter-domains and intra-domains, the boundaries of the DBR domains are defined.

In the case where multiple DBR domains are defined, as shown in FIG. 2, in accordance with the DBR protocol, the source CPE 112 originates a connection at an edge node 221 ("originator") included in the domain 211 to an edge node 231 ("terminator") included in the domain 217 to establish a call path to the destination CPE 114 through the nodes of the other domain 213. Each node includes a CAC component as mentioned in relation to FIG. 1. The time and use of network resources for connection recovery or path optimization are smaller inside a DBR rerouting domain than inside an end-to-end (single) domain, because the number of nodes involved in the procedures are smaller. In an H-PNNI network, if the DBR domain boundaries match the PNNI peer groups then connection recovery and path optimization are based on local topology visible from the rerouting node allowing a better route selection.

In the network shown in FIG. 2, the existing path is, for example, a path (shown by the thickest line) between the node 221 of the DBR domain 211 and the node 231 of the DBR domain 217 through nodes of the other domain 213. In this case, the nodes 221 of the domain 211, the node 233 of the domain 213 and the node 235 of the domain 217 are "rerouting nodes" and the node 245 of the domain 211, the node 237 of the domain 213 and the node 231 of the domain 217 are "rendezvous nodes". In each domain, the rerouting and rendezvous nodes perform their functions in accordance with the DBR protocol. The rerouting operation in one domain is independent from other domains. Events associated with the existing path to reroute are, for example, connection recovery from a link failure and path optimization. In an occurrence of a failure of a link 241 between the nodes 243 and 245 in the DBR domain 211, a path may be switched to a replacement path between the nodes 243 and 245 including a section path through nodes 247, 249 and 245 in that DBR domain 211. Similarly, due to path optimization, the existing path may be switched to the replacement path.

However, only the links in the same DBR domain are supported by the rerouting procedures and the links between the DBR domains are not supported by the rerouting procedures. Thus, the intra-domain links are protected, but the inter-domain links are not protected (i.e., the rerouting via another DBR domain is not supported by the DBR protocol). Therefore, if, for example, a link 251 interconnecting the node 237 of the DBR domain 213 and the node 235 of the neighbor DBR domain 217 fails, the connection is released to the end users. Also, path optimization is restricted to the DBR domain and therefore, the entire network ("global end-to-end") optimization is not supported.

III. Global Rerouting

By way of background, the present invention provides "global" rerouting in connection-oriented communication networks. In an implementation specific example of the global rerouting system and method of the present invention, signaling messages for call setup are populated with new definitions of information elements (IEs) that carry information pertaining to requested global rerouting services origination and termination call points and to negotiated local rerouting services. The new IE definition is created in a way that is compatible with information (potentially) present in call setup messages that pertains to request local rerouting services. Call control for processing of call setup, connect and release messages is defined to differentiate between local and global rerouting services and support both. Solution definitions for the global rerouting are created in a way that allows both local and global rerouting services to be enabled simultaneously, thereby offering double fault protection and other solutions to problems described earlier regarding the EBR and DBR protocols. This feature introduces the concept of a global rerouting domain. The global rerouting overcomes the disadvantages of the above-mentioned rerouting in the multiple local domains. At the present time, the global rerouting protocol is not standardized.

Figure 3A:
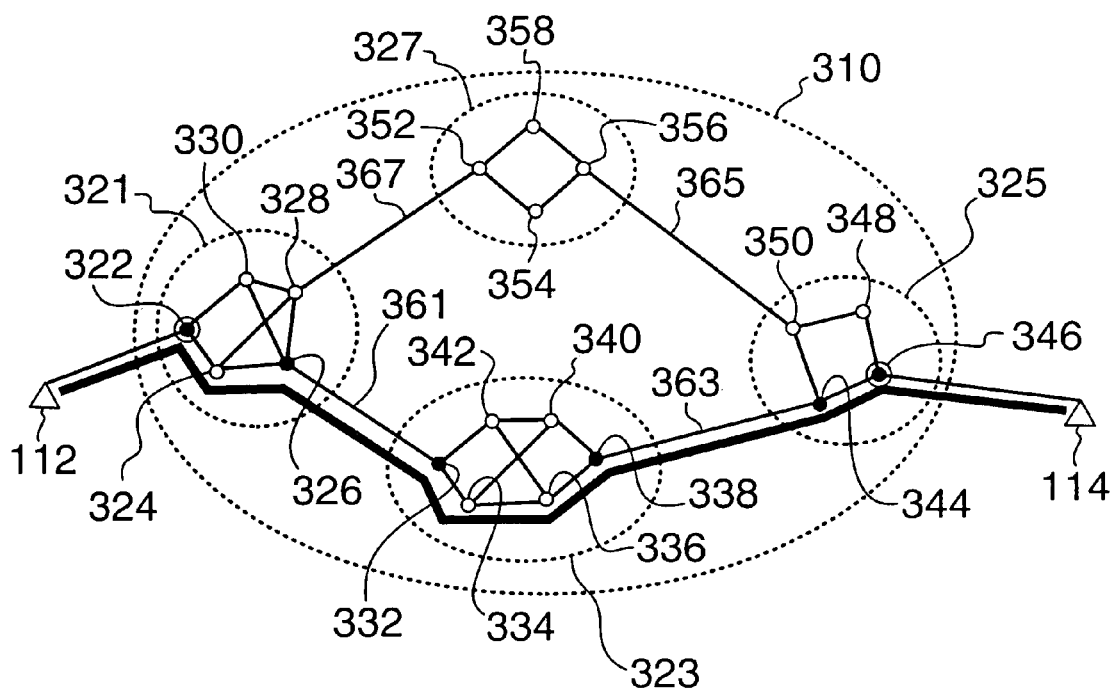
FIG. 3A illustrates a global rerouting implementation according to one embodiment of the present invention.

FIG. 3A illustrates global rerouting implementation according to one embodiment of the present invention. Referring to FIG. 3A, the entire PNNI network is defined as a single rerouting domain wherein the interconnected nodes are included. The single domain is further defined as multiple divided domains (e.g., four divided domains). Each of the divided domains includes multiple interconnected nodes. The single rerouting domain is referred to as a "global" rerouting domain 310 and the four divided domains are referred to as "local" rerouting domains 321, 323, 325 and 327. The global rerouting domain 310 encapsulates all of the local rerouting domains 321, 323, 325 and 327. Each of the local domains 321, 323, 325 and 327 is defined by multiple nodes. The global rerouting protocol implemented in the PNNI network shown in FIG. 3A is an added extension of the DBR protocol. The global rerouting protocol is advantageous over the local rerouting protocol with the above-mentioned DBR protocol, because in the former protocol, all the local inter-domain links are protected and the latter protocol, the inter-domain links are not protected. In accordance with the global rerouting protocol, global connection recovery and global path optimization can be performed. In order to successfully establish a global rerouting domain, the DTL originator and the DTL terminator must subscribe to the global rerouting.

In FIG. 3A, the rerouting domain 321 includes interconnected nodes 322, 324, 326, 328 and 330. Similarly, the rerouting domain 323 includes interconnected nodes 332, 334, 336, 338, 340 and 342. The rerouting domain 325 includes interconnected nodes 344, 346, 348 and 350. The rerouting domain 327 includes interconnected node 352, 354, 356 and 358. The nodes of the domains are interconnected to the nodes of the other domains through respective links. Each node includes a CAC component as mentioned in relation to FIG. 1 and it further performs functions for the global and local domain node. Each of the edge nodes has software of performing the functions of the PNNI interface to a CPE and each edge node is capable of being accessed by a CPE connected thereto.

The PNNI interface is may be a hardware module running the PNNI protocol. The node has multiple PNNI interfaces. One PNNI interface is connected to another PNNI interface through a physical medium. The sums of the entire PNNI interfaces create the PNNI network, so that the network performs functions and includes mechanisms to achieve global rerouting. The mechanisms may include a call path connection system for establishing a call path and a reroute/connection control systems for establishing a replacement path, a generator for generating a rerouting request and a determination systems for determining a new call path, among others. Specific description of the various components of the systems of the present invention is described on conjunction with FIGS. 3B and 3C.

Here, as an example, in the PNNI network, the source CPE 112 is connected to the node 322 and the destination CPE 114 is connected to the node 346. It is supposed that the source CPE 112 (the calling party) originates a connection to establish a call path to the destination CPE 114 (the called party) through the nodes of the rerouting domains. The source CPE 112 accesses the node 322 ("originator") included in the rerouting domain 321 and the destination CPE 114 accesses the node 346 ("terminator") included in the rerouting domain 325.

In the global rerouting protocol, as with EBR, the role of any particular node as a rerouting node or rendezvous node is determined by the context of the connection. In particular, when a node is said to be a local rerouting node what is meant is that it is playing that role for a particular connection (or set of connections), for other connections the same node could be a global rendezvous node. For connections that are not subscribed to rerouting services, the node has no rerouting services role. Since node role terms will be used, it is important to understand that the role is specific to each connection. Here, it is assumed that for example, the existing path, once established, is a call path (shown by a bold line) between the node 322 of the domain 321 and the node 342 of the domain 325 through nodes of the other domain 323.

Regarding the established path in the single and global domain network from the calling party to the called party, the node 322, 332 and 344 are the furthest downstream nodes in the respective rerouting domains 321, 323 and 325, and the nodes 326, 338 and 346 are the furthest upstream nodes in the respective rerouting domains. Thus, the nodes 322, 332 and 344 behave as "local rerouting nodes" and the nodes 326, 338 and 346 behave as "local rendezvous nodes". Also, regarding the established path in the single and global domain network, the node 322 of the domain 321 is the furthest downstream node in the entire path and the node 346 of the domain 325 is the furthest upstream node in the entire path.

Hence, the nodes 322 and 346 perform double functions for the local rerouting domain 321 and the single global domain 310 and the nodes 322 and 346 behave as a "local/global rerouting node" and a "local/global rendezvous node" node, respectively. A link 361 between the domains 321 and 323, a link 363 between the domains 323 and 325, a link 365 between the domains 325 and 327, and a link 367 between the domains 327 and 321 are referred to "inter-domain links". The links between the two nodes inside a single local rerouting domain (e.g., the link interconnecting the nodes 324 and 326 in the local domain 321, the link interconnecting the nodes 332 and 334 in the local domain 323, the link interconnecting the nodes 344 and 346 in the domain 325) are referred to "intra-domain links".

The behavior of the nodes of the local rerouting domains in the network shown in FIG. 3A are different from the local domain nodes in compliance with the DBR and EBR protocols mentioned above in relation to FIGS. 1 and 2. Hence, the CAC components of the local domain nodes are modified or further include additional functions to be in compliance with the global rerouting protocol and thus, the PNNI network defined by the global rerouting domain 310 shown in FIG. 3 to support the global rerouting protocol. Specifically, the modified nodes handle new information transported in DBR relevant IEs (such as the Rerouting Services IE) pertaining to global rerouting information. This feature of the global rerouting introduces the concept of local domain identifier, which is used to determine the local rerouting link type. The local domain identifier is advertised on each PNNI interface.

The local domain boundaries are defined using the local domain identifiers. Each of the local rerouting domains 321, 323, 325 and 327 has a unique identifier which is known by each node in the local domain and is advertised on all their PNNI links. A system capabilities information group (IG) containing the domain identifier is added to advertise the local domain identifier. Each node compares the local domain identifier of its PNNI neighboring node with its own local domain identifier to determine the local domain link type. If the neighboring local domain identifier is identical to the local domain identifier of the node, then the link is an intra-domain link. If the neighboring local domain identifier is different from the local domain identifier of the node, then the link is an inter-domain link. If the neighbor does not advertise any local domain identifier, (i.e., the neighbor does not support that functionality) then the link is an intra-domain link. If the neighbor's local domain identifier is 0, then the link is an intra-domain link, regardless of the node's own local domain identifier. If the node's own local domain identifier is 0, then all the links are intra-domain links, regardless of each neighbor's local domain identifier.

Route calculations for connections undergoing connection recovery or path optimization are done according to the existing PNNI route calculation algorithm. Route calculation is thus based on and limited to the visible PNNI topology of the rerouting node. Due to the limited view of the PNNI topology from the rerouting node support of the cumulative administrative weight (CAW) is introduced by this feature. This allows path optimization to determine whether a new path is truly better than the incumbent path based on comparison of CAW values of the new connection segment and the incumbent connection segment. Administrative Weight (AW) is a measure of the cost of a link. Route selection can be optimized based on the optimization metrics of AW and quality of the ATM connection, i.e., Maximum Cell Transfer Delay (CTD) and Cell Delay Variation (CDV). The cumulative metrics for CTD and CDV provide the end-to-end CTD and CDV values for the entire connection. The CAW provides the end-to-end AW value for the entire connection.

The DBR protocol introduces a new octet group in the "Optional Traffic Attribute" IE (BCS). The purpose of this octet group is to accumulate the actual CAW of the route inside the local domain. If the routing decision is based on AW, the CAW information is used during an optimization to determine if the rerouting segment has a better CAW then the incumbent segment.

Figure 3B:
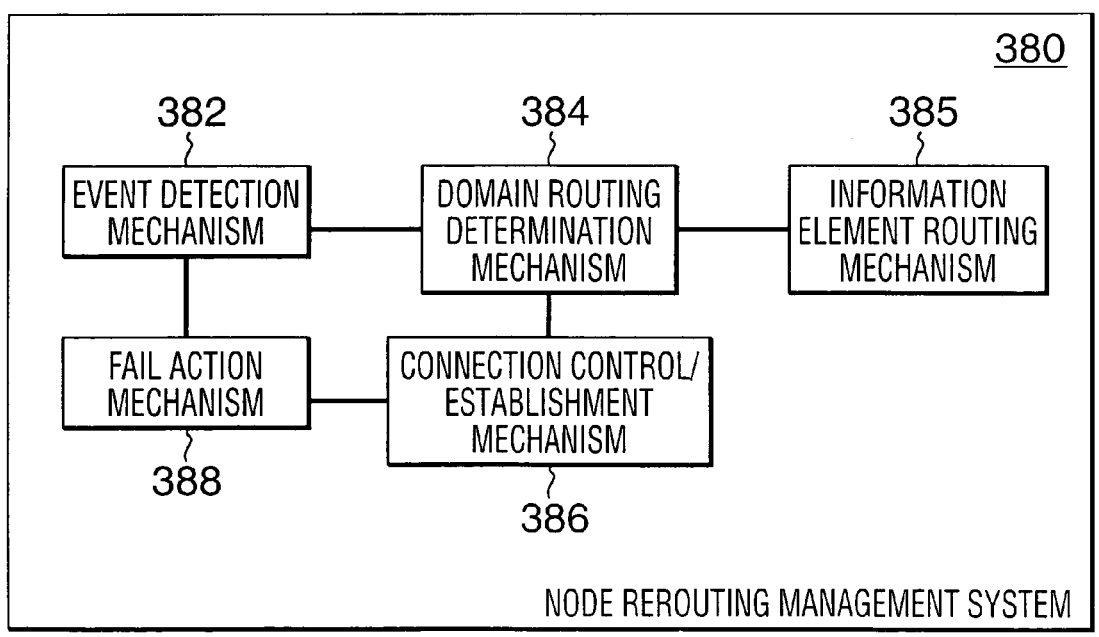
FIG. 3B illustrates a block diagram of a node rerouting management system according to an embodiment of the present invention.

FIG. 3B illustrates a block diagram of a node rerouting management system 380 according to an embodiment of the present invention. In the context of describing the node system 380, the view point is of a node in the network. More particularly, the node system 380 performs rerouting of a connection in a network having interconnected nodes defining a first domain. The connection is defined as a path between an originating node and a terminating node. A first domain includes a plurality of second domains defined by a subset of the interconnected nodes. The node system 380 includes an event detection mechanism 382 that detects a request (either cause or domain) to reroute a first section of a path of a connection in a reroute domain. The reroute domain is defined as one of either the first domain or one of the second domains. The node system 380 also includes a domain routing determination mechanism 384 that determines a new first section for the path in the reroute domain. The mechanism 384 includes an information element routing mechanism 385 for determining the new first section for the path in the reroute domains in accordance with the identifier information element (detailed below). A connection control/establishment mechanism 386 is used to determine and, actually establish a connection, if the connection can be established along the path through the new first section (i.e., the originating node and the terminating node remain connected). A fail action (primary-$1^{st}$ and secondary-$2^{nd}$ domain) mechanism 388 requests rerouting of the connection along a second section of the path in the other of either the first domain or one of the second domains when the connection along the path through the new first section is not established as described above.

Figures 3C, 4:
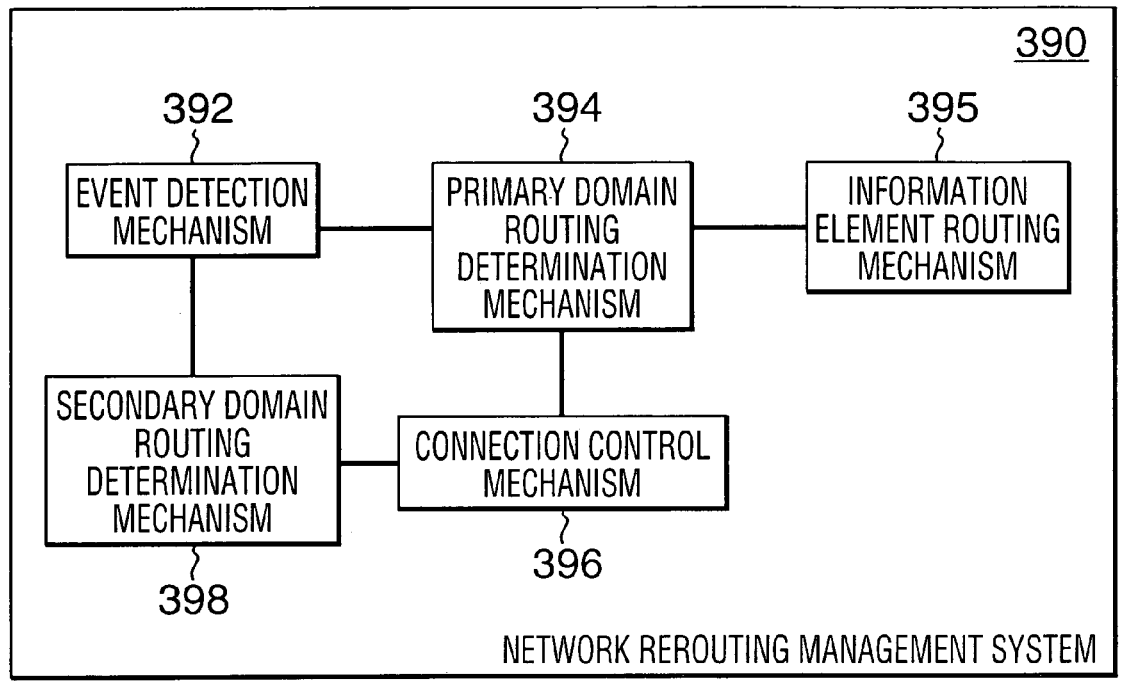
FIG. 3C illustrates a block diagram of a network rerouting management system according to an embodiment of the present invention.
FIG. 4 shows an example structure of rerouting service information elements for supporting a global rerouting protocol.

FIG. 3C illustrates a block diagram of a network rerouting management system 390 according to an embodiment of the present invention. In the context of describing the network system 390, the view point is of the overall network. More particularly, the network system 390 performs rerouting of a connection in a network having a interconnected nodes defining a first domain. The connection is defined as a path between an originating node and a terminating node. A first domain includes a plurality of second domains defined by a subset of the interconnected nodes. The network system 390 includes an event detection mechanism 392 that detects an event (either cause or domain) in the network (e.g., from IEs described below) indicating a cause to reroute a first section of the path of the connection in a first reroute domain. The first reroute domain is one of either the first domain or one of the second domains. A primary domain routing determination mechanism 394 determines a new first section for the path in the first reroute domain. The mechanism 394 includes an information element routing mechanism 395 for determining the new first section for the path in the reroute domains in accordance with the identifier information element (detailed below). A connection control/establishment mechanism 396 determines (and to actually establish) if the connection can be established along the path through the new first section. A secondary domain routing determination mechanism 398 reroutes the connection along a second section of the path in a second reroute domain when the connection along the path through the new first section is not established. The second reroute domain is the other of either the first domain or one of the second domains.

The node system 380 and the network system 390 may be implemented in any conventional computer programming language. For example, embodiments may be implemented in a procedural programming language (e.g. "C") or an object oriented language (e.g. "C++"). Further the systems 380 and 390 of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g. a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet or World Wide Web). Some embodiments of the invention may be implemented as a combination of both software (e.g. a computer program product) and hardware (termed mechanisms). Still other embodiments of the invention may be implemented as entirely hardware, or entirely software (e.g. a computer program product)."

FIG. 4 shows an example of the rerouting service information elements (IEs), which are organized to support the global rerouting and DBR protocols and may be used in implementing the systems and method of the present invention. In the IEs shown in FIG. 4, octets 1–8 are information for supporting the standard DBR protocol. Octets 9–12 are information for supporting the global rerouting protocol and the information defined therein is additional to the standard DBR IEs. The new octet group (octets 9–12) identifies the global services to be negotiated.

Octet 1 defines rerouting service information element identifier.

Octet 2 defines IE instruction field.

Octets 3 and 4 define a length of the rerouting services.

Octet 5 defines inter-domain services.

Octet 6 defines inter-domain capabilities.

Octet 7 defines intra-domain services.

Octet 8 defines intra-domain capabilities.

Octet 9 defines global rerouting octet identifier. This octet identifies the meaning of the following byte.

Octet 10 defines the global rerouting octet length. The byte of the octet identifies the number of byte of data included in the global rerouting octet groups.

Octet 11 defines global intra-domain services and it includes spare, a soft rerouting class and a hard rerouting class. The byte identifies the global rerouting services requested and negotiated between the global rerouting node and the global rendezvous node.

Octet 12 defines the global intra domain capabilities and it includes spare, asymmetric software, symmetric software and hard rerouting. The byte identifies the global rerouting capability for the global rerouting connection.

FIG. 5 shows an example of the rerouting information elements (IEs), which are organized to support the global rerouting and DBR protocols and may be used in implementing the systems and method of the present invention. The IEs shown in FIG. 5 include ones for supporting the standard DBR and for supporting the global rerouting protocol. The IEs for the global rerouting are additional to the standard DBR IEs. In the IEs shown in FIG. 5, octets 1–10 are information for supporting the standard DBR protocol. Octets 11–16 are information for supporting the global rerouting protocol and the information defined therein is additional to the standard DBR IEs. Octets 5–16 (shown with *) are optional.

Octet 1 defines the rerouting information element identifier.

Octet 2 defines the IE instruction field.

Octets 3 and 4 define the length of the rerouting services.

Octet 5 defines the edge node identifier. It includes octet 5.1 for the length of the edge node identifier contents and octets 5.2 to 5.21 for the edge node AESA. AESA is the ATM end system address which is a string of 20 bytes for identifying the ATM node.

Octet 6 defines the endpoint key identifier. It includes octet 6.1 for the length of the endpoint key contents and octets 6.2 to 6.5 for the rerouting control.

Octet 7 defines the rerouting control identifier. It includes octet 7.1 for the length of rerouting control contents and octets 7.2 to 7.4 for the rerouting control.

Octet 8 defines PNNI Cumulative Forward Maximum Cell Transfer Delay identifier. It includes octet 8.1 for the length of the maximum CTD contents and octets 8.2 to 8.4 for the Cumulative Forward Maximum Cell Transfer Delay value.

Octet 9 defines the Cumulative Forward Peak-to-Peak Cell Delay variation identifier. It includes octet 9.1 for the length of the Cumulative Forward Peak-to-Peak Cell Delay variation contents and octets 9.2 to 9.4 for the Cumulative Forward Peak-to-Peak Cell Delay variation value.

Octet 10 defines the Cumulative Backward Peak-to-Peak Cell Delay variation identifier. It includes octet 10.1 for the length of the Cumulative Backward Peak-to-Peak Cell Delay variation contents and octets 10.2 to 10.4 for the Cumulative Backward Peak-to-Peak Cell Delay variation value.

Octet 11 defines the global edge node identifier. It includes octet 11.1 for the length of global edge node identifier contents and octets 11.2 to 11.4 for the global edge node AESA.

Octet 12 defines the global endpoint key identifier. It includes octet 12.1 for the length of the global endpoint key contents and octets 12.2 to 12.5 for the global endpoint key.

Octet 13 defines the global rerouting control identifier. It includes octet 13.1 for the length of the global rerouting control contents and octets 13.2 to 13.4 for the global rerouting control information.

Octet 14 defines the global PNNI Cumulative Forward Maximum Cell Transfer Delay identifier. It includes octet 14.1 for the length of the global maximum CTD contents and octets 14.2 to 14.4 for the global Cumulative Forward Maximum Cell Transfer Delay value.

Octet 15 defines the global Cumulative Forward Peak-to-Peak Cell Delay variation identifier. It includes octet 15.1 for the length of the global Cumulative Forward Peak-to-Peak Cell Delay variation contents and octets 15.2 to 15.4 for the global cumulative Forward Peak-to-Peak Cell Delay variation value.

Octet 16 defines the global Cumulative Backward Peak-to-Peak Cell Delay variation identifier. It includes octet 16.1 for the length of the global Cumulative Backward Peak-to-Peak Cell Delay variation contents and octets 16.2 to 16.4 for the global cumulative Backward Peak-to-Peak Cell Delay variation value.

Figures 6, 7:
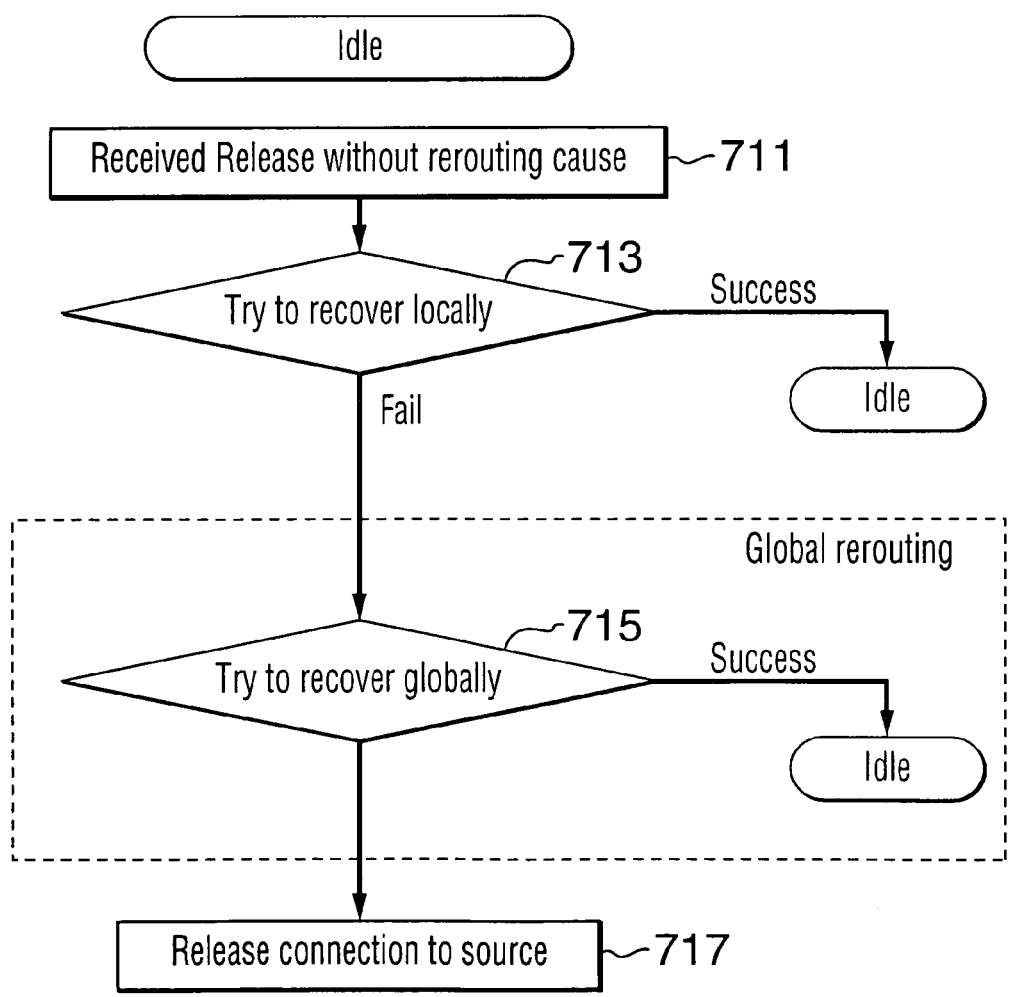
FIG. 6 shows an example of the structure of rerouting cause code information elements.
FIG. 7 is a flowchart showing the steps of connection recovery without a rerouting cause code in the embodiment shown in FIG. 3.

The new group of octets allows negotiation of global rerouting services during call establishment. The global Edge Node Identifier is used to identify the global rendezvous node. During a global connection recovery or a global path optimization, the global connection segment terminates at this address. The global endpoint key identifier is used to identify the connection at the global rendezvous node. The global rerouting control identifier is used to identify the type of switchover mechanism and to identify the instance of a setup message. The global PNNI Cumulative Forward Maximum Cell Delay Transfer, the global Cumulative Forward Peak-to-Peak Cell Delay variation and the global Cumulative Backward Peak-to-Peak Cell Delay variation are used to guaranty the quality of services during the global connection recovery and the global path optimization FIG. 6 shows an example of the rerouting cause code information elements (IEs) and may be used in implementing the systems and method of the present invention. In the IEs shown in FIG. 6, octet 1 defines a rerouting cause code element identifier (in the form of 0xf2); octet 2 defines an IE instruction field; octet 3 defines a length of the rerouting service; octets 4 and 5 defines a length of the rerouting service; and octet 5 defines a rerouting cause code value. Here, two new rerouting cause codes are introduced by the global octet. Table I provides the meanings of the values of the IEs shown in FIGS. 4–6.

TABLE I

| Rerouting | Value | Description |
| --- | --- | --- |
| DBR | 0×01 | release receive from outside local rerouting domain |
| DBR | 0×02 | failed to recover the connection using local domain based rerouting |
| DBR | 0×03 | Unrecognized endpoint key for rerouting |
| DBR | 0×04 | rerouting operation completed |
| DBR | 0×05 | old incarnation number |
| DBR | 0×06 | rerouting operation already in progress |
| DBR | 0×07 | violation of rerouting domain boundary |
| DBR | 0×08 | Unsupported switchover behavior |

TABLE I-continued

| Rerouting | Value | Description |
| --- | --- | --- |
| Global | 0×12 | failed to recover the connection using global rerouting protocol |
| Global | 0×14 | global rerouting operation successful |

The event where the existing path, once established, is required to be rerouted is, for example, connection recovery caused by a link failure and path optimization for connecting through a desirable path. The following will describe local and global connection recovery and global path optimization in accordance with the global rerouting procedure.

In the PNNI network shown in FIG. 3, in which a connection traverses multiple local rerouting domains, the connection registers for local rerouting in all local domains 321, 323, 325 and 327. Local path optimization and connection recovery are affected by a change of local domain boundaries. The local path optimization and connection recovery must be accomplished inside the local domain. If the local boundary is moved such that the local rendezvous node for a connection is moved to another local domain, then local path optimization and local connection recovery will not work as the edge of the local domain will be reached by the rerouted connection before the rendezvous node. Therefore, the local domains must be defined to perform the rerouting for the global, local connection recovery and path optimization.

FIG. 7 shows the steps of the connection recovery without a rerouting cause code in the network shown in FIG. 3. The node (e.g., the local rerouting node 332 of the local domain 323) receives a call release without a rerouting cause (step 711). A connection recovery in the local rerouting domain is attempted (step 713). This is done in accordance with the DBR procedure using the rerouting services IEs and rerouting IEs (the DBR octets) shown in FIGS. 4 and 5 as a specific implementation example. In a case of the attempt being successful, the connection path is switched from the existing path to a replacement path. The failed link (e.g., the link between the nodes 334 and 336 of the local domain 323) is not part of the replacement path in that local domain (e.g., through the nodes 332, 342, 340 and 338 in that local domain 323), resulting in the call path being rerouted and the procedure by the node becomes idle.

At step 713, if the local recovery attempt is failed, a connection recovery in a global basis is triggered, so that the global connection recovery is attempted (step 715). Even though the node 332 behaves as a local rerouting node, it does not behave as a global rerouting node. The call release is sent to the source node (i.e., the neighbor domain 321 in the downstream direction) (step 717). When the call release reaches the node 322 of the local domain 321, if the node 322 has registered for the global connection recovery, then release message is filtered and the global recovery is attempted (step 715). The global/local rerouting domain 322 initiates the global connection recovery. The global rerouting is done in accordance with the global rerouting procedure using the rerouting services IEs and rerouting IEs (the global octets) shown in FIGS. 4 and 5. By rerouting, the existing path is replaced with a new path. In the replacement path, the new global connection QoS must meet the current QoS connection of the global connection in the existing path.

Since the local domains 321, 323 and 325 are independent; it is possible that multiple local connection recoveries in those domains can take place simultaneously. If a local connection recovery in any of the local domains does not restore the connection ("fail" at step 713), the global connection recovery will be triggered (move on to step 715).

In a case where the global rerouting node 322 received a release message from a calling party (i.e., the source CPE 112) and the release code does not include a rerouting cause code, the release is inside the local rerouting domain 321 wherein the global rerouting node 322 is included. Then, a connection recovery is attempted in the local rerouting domain 321 (step 713) and if failed, the failure is outside the domain 321, that is, the failure is inside or outside the global domain 310. A global connection recovery is attempted (step 715). If the connection recovery is failed both locally and globally, the failure is outside the global domain 310 and it is unable to recover the call connection, resulting in release to the source (step 717).

The global connection recovery is only possible, in a case where during the negotiation of the original connection the global recovery has been negotiated. A hard reroute is enabled based on the global intra-domain capabilities byte (see FIG. 4). During the global connection recovery, a new connection is attempted from the global rerouting node 322 to the global rendezvous node 346. The global rendezvous node identifies inside the rerouting IE (the global Edge Node Identifier (octet 11) and the global Endpoint key identifier (octet 12) shown in FIG. 5). Only the global rerouting parameters are used from the call establishment. If the connection satisfies the QoS (the global Forward Maximum CTD (octet 14) and/or global Forward Peak-to-Peak CDV (octet 15) and/or the global Backward Peak-to-Peak CDV (octet 16) shown in FIG. 5) of the global segment, the global connection segment switches this data path to the global rerouting path. During the establishment of the global connection, each local domain negotiates a new set of local rerouting parameters.

Figure 8:
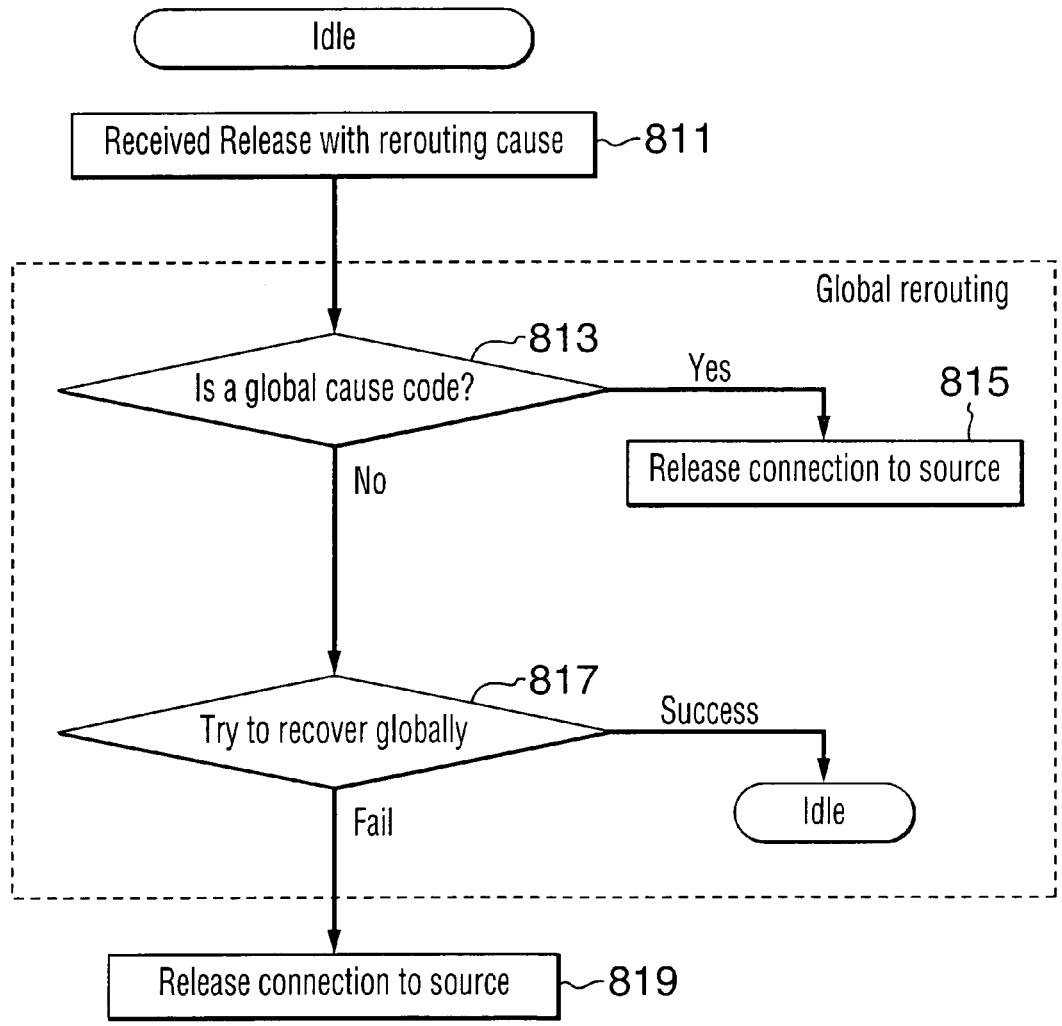
FIG. 8 is a flowchart showing the steps of connection recovery with a rerouting cause code in an embodiment shown in FIG. 3.

FIG. 8 shows the steps of the connection recovery with a rerouting cause code in the network shown in FIG. 3. In a case where the global rerouting node 322 receives a release message from the calling party (i.e., the source CPE 112) (step 811) and a rerouting cause code included in the call release is determined if the release message is a global cause code or not (step 813). The local rerouting cause code's values are defined as shown in Table I. In a case where the code is a global cause code, the connection is released to the source node (the code's value is shown in Table I (step 815)). In a case where the received code is a local cause code, a connection recovery in a global basis is attempted (step 817).

The global connection recovery is done in accordance with the global rerouting which is initiated by the global/local domain node 322. If the attempt is successful (the code's value as shown in Table I), the failed link (e.g., the link 363) will not be part of the global replacement path, which is a path through the links 367 and 365 being interconnected by the other local domain 327. Then, the procedure becomes idle. If the attempt at step 817 fails (the code's value as shown in Table I), the failure will be outside the global domain 310 and the connection is released to the source (step 819).

In summary, as described above, the global rerouting introduces the double fault protection capability of local and global procedures. If a failure occurs inside a local rerouting domain, then the local connection recovery is attempted. If a failure occurs outside a local rerouting domain, then the global connection recovery is attempted. To be a valid connection segment, the new connection segment must meet the negotiated QoS constraints of the connection segment.

Path optimization can be either local or global. Global path optimization can only be triggered by the global rerouting node (i.e., the node 322 as shown in FIG. 3). The global new connection must respect the original global QoS of the connection. If the global path optimization is not successful and the local path optimization is subscribed, then the local path optimization is attempted. The local path optimization is triggered by the local rerouting node (e.g., the node 332 for the local rerouting domain; the node 344 for the local rerouting domain 325). The local connection segment must preserve the original QoS of the local connection segment. Because each local domain is independent, multiple local path optimizations (e.g., in the local rerouting domains 323 and 325) can occur simultaneously. Additionally, the global path optimization may occur simultaneously with one or more local path optimizations. The global path optimization takes precedence over any local path optimizations.

Figure 9:
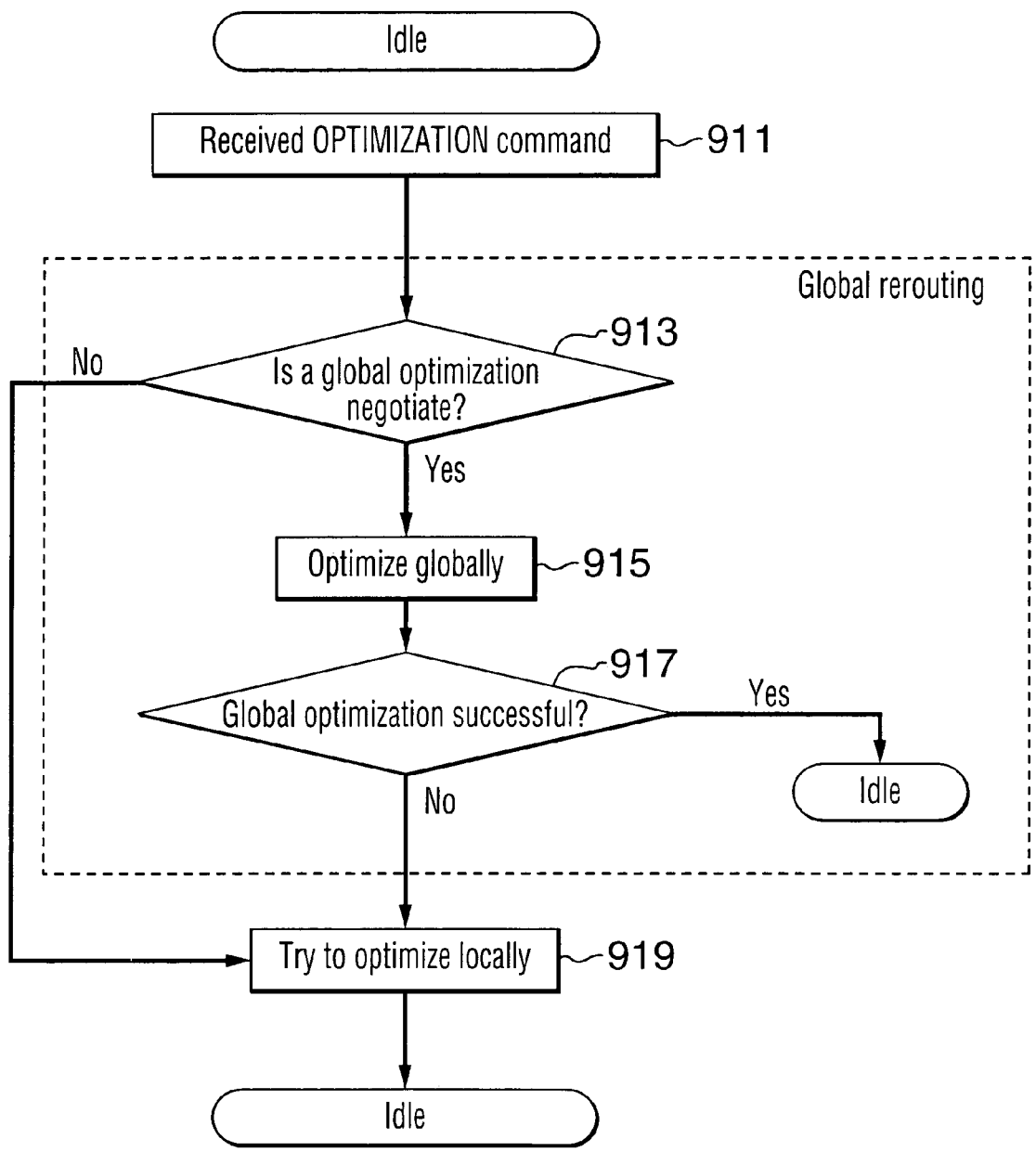
FIG. 9 is a flowchart showing the steps of path optimization in a global basis, in an embodiment shown in FIG. 3.

FIG. 9 shows the steps of path optimization in a global basis in the network shown in FIG. 3. The node receives an OPTIMIZATION command (step 911). It is determined whether the received command is for a global optimization negotiation (step 913). In a case of the command being for the global optimization negotiation, the path optimization is attempted in a global basis (step 915). If the global path optimization is successful (positive at step 917), the procedure will become idle. If the attempt is not successful, the path optimization will be attempted in a local basis (step 919) and then, the procedure becomes idle. During the global optimization, the local rerouting nodes 332 and 344 and the local rendezvous nodes 326 and 338 are renegotiated and will align with the new local domain boundaries.

In accordance with the OPTIMIZATION command received at step 911, if the node is a global rerouting node and the connection negotiates the service for "global and local path optimization", then the global path optimization is first attempted (step 915). In a case of an unsuccessful global path optimization (step 917), the local path optimization is attempted (step 919). If the node is a local rerouting node and the connection negotiates the service for "global and local path optimization", then only local optimization is attempted (step 919). If the node is a global rerouting node and the connection negotiates the service of "global path optimization only", then the only global path optimization is attempted (step 917). If the node is a local rerouting node and the connection negotiates the service of global optimization, then no action is taken.

The global path optimization (step 915) is only possible in a case where during the negotiation of the original connection, the global path optimization has been negotiated (positive determination at step 913). Asymmetrical soft rerouting is enabled in the Global intra-domain capabilities byte shown in FIG. 4 (octet 12). During a global path optimization (step 917), a new connection is attempted from the global rerouting node 322 to the global rendezvous node 346 (the global rendezvous node is identified by the rerouting IE (the global Edge Node Identifier (octet 11) and the global Endpoint key identifier (octet 12) shown in FIG. 5). The QoS of the global connection segment is identified by the rerouting IE (the global Forward Maximum CTD (octet 14) and/or global Forward Peak-to-Peak CDV (octet 15) and/or the global Backward Peak-to-Peak CDV (octet 16) shown in FIG. 5).

If the global QoS of the new connection improves over the existing global rerouting connection, then the global connection segment will switch the data (call) path to the global rerouting path (i.e., a replacement path). During the establishment of the global connection, the domains negotiate a new set of local rerouting parameters with each other. The global rerouting node is then releasing the old global path with a rerouting cause code set to 0x14 (Table I, global rerouting operation successful).

The path optimization can be invoked either automatically depending on time of day or manually through an operator command. Automatic path optimization is performed on the entire module. Manually invoked path optimization can be performed on the entire module, a single interface, or a single connection.

If the path optimization and connection recovery activities are being performed on different rerouting nodes as may be the case for a global path optimization and local connection recovery, then each rerouting service will attempt to complete independently. Specifically, the local connection recovery on the local rerouting node will complete unless interrupted by a release of the connection from the global rerouting node, which could be a result of a successfully completed global path optimization.

For example, the defined single rerouting domain operates as a global rerouting domain and each divided rerouting domain operates as a local domain. The first and second divided domains along the established call path are the furthest downstream and upstream domains, respectively. Along with the established call path, the furthest downstream and upstream nodes in each of the local domain behave local rerouting and rendezvous nodes, respectively. Also, the rerouting node of the first divided (local) domain and the rendezvous node of the second divided (local) domain behave as global rerouting and rendezvous nodes, respectively. The step of determining a new call path is performed by the local rerouting and rendezvous nodes of the local domain and the global rerouting and rendezvous nodes. The step of generating a rerouting request comprises the step of providing the identifier IE associated with nodes inside and outside one local domain, so that the new set of nodes connected in the new call path are inside the global rerouting domain. The step of determining a new call path may comprise the step of establishing the new call path connecting the new set of nodes between the rerouting and rendezvous nodes of different local domains. The event associated with the established connection between the nodes may be a link failure. The step of generating a rerouting request may comprise the step of providing a connection recovery request.

The method for providing a rerouting connection may comprise the step providing IEs in accordance with the Domain-Based Rerouting (DBR) standards of the Private Network-Network Interface (PNNI) network. In the method, the network of the single rerouting domain is defined by multiple divided domains. The boundaries of the divided domains are defined with reference to part of the DBR IEs.

Advantageously, provided are unique IEs associating with rerouting and rendezvous nodes of each of the divided domain. The unique IEs are different from the DBR IEs. A new call path connecting a new set of nodes is determined in accordance with the IEs associating with rerouting and rendezvous nodes of the divided domains. The new call path connecting the new set of nodes is determined in accordance with the determined new call path. The new call path includes segment replaced paths inside the divided domain or between the divided domains.

Advantageously, the rerouting method according to an embodiment of the present invention is capable of connection recovery and path optimization outside of any rerouting domains, i.e., global rerouting. It offers double fault recovery: 1) within the rerouting domain as covered by DBR; and 2) outside of the domains or when the initial fault recovery within the domain has failed. It also offers maximum path optimization by first attempting path optimization across all domains and upon failure an optimization within the rerouting domain. This increases the economy of network resource and bandwidth utilization, since path optimization within a rerouting domain not does take into account paths outside of its domain. The rerouting method defines a second connection recovery across all domains thereby offering double fault protection. The rerouting method protects such resources and defines a connection recovery as a result thereby offering single fault protection for resources that were not protected previously. The rerouting method considers network resources both inside and outside of the divided domains in order to maximize the efficiency of network resource utilization.

As a further example, the determination mechanisms 384 (of FIG. 3B, and 394, 398 of FIG. 3C) comprises an intra-domain call manage mechanism and an inter-domain call manage mechanism. The intra-domain call manage mechanism establishes the replacement path connecting the new set of nodes inside one divided domain with the rerouting and rendezvous nodes in that divided domain. The inter-domain call manage mechanism establishes the replacement path connecting the new set of nodes between the divided domain with the rerouting node of one divided domain and the rendezvous nodes of the other divided domain.

The event detection mechanism 382/392 may comprise an information provider for providing cause for the event associated with the event. The cause results in rerouting of connection recovery or path optimization, so that the determination mechanism performs the rerouting accordingly. The reroute mechanism may further comprise an information provider for providing information identifying inter-domain or intra-domain. The determination mechanism performs the rerouting inside one divided domain or between the divided domains.

According to the present invention, it is possible to ensure the entire connection-oriented network is a single rerouting domain to enable the connection recovery service and the path optimization in the entire network to be carried out in a large scale.

In summary, the systems and methods of the present invention are able to offer a significant value added connection service. The particular implementation of the present invention is applied to ATM, but, in general, the present invention is transferable to all other connection-oriented technologies. Implementation of the present invention enables to offer a service to a customer that enables double fault protection for network resources through local and global connection recovery. It also increases the efficiency and economy of network resource utilization through the introduction of global path optimization. This type of service is extremely attractive in carrier type networks where network robustness is highly important as well as efficiency and economy of network resource utilization to bring down operational costs. The rerouting method by the global domain for connection recovery and path optimization can be applied to the MPLS networks and TDM and Optical networks.

Although particular embodiments of the present invention have been described in detail, there are numerous variations. It should be appreciated that numerous variations, modifications, and adaptations may be made without departing from the scope of the present invention as defined in the claims.

What is claimed is:

1. A method of rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said method comprising:

detecting a request to reroute a first section of the path of the connection in a reroute domain, wherein said reroute domain is one of either the first domain or one of the plurality of second domains;

determining a new first section for the path in said reroute domain;

determining if the connection can be established along the path through said new first section; and requesting rerouting of the connection along a second section of the path in the other of either the first domain or one of the plurality of second domains when the connection along the path through said new first section is not established;

the step of detecting said request includes determining if said request is a request for detected failure rerouting or a request for path optimization; and said request for detected failure routing is based on a failure in the network and indicates rerouting in one of the first domain, one of the plurality of second domains, or any of the first domain and one of the plurality of second domains; and the step of detecting said request further includes:

determining if said request for detected failure routing indicates rerouting in the first domain, one of the plurality of second domains or any of the first domain and one of the plurality of second domains.

2. The method according to claim 1 wherein the step of determining if the connection can be established includes:

establishing the connection along the path through said new first section if the connection can be established wherein the originating node and the terminating node remain connected.

3. The method according to claim 1 wherein said request for detected failure routing indicates rerouting in the first domain and said reroute domain is the first domain and said first section of the path is the entire path; and wherein the step of determining said new first section includes:

determining a new path between the originating node and the terminating node in the first domain; and wherein the step of determining if the connection can be established includes:

establishing the connection along said new path in the first domain.

4. The method according to claim 1 wherein said request for detected failure routing indicates rerouting in one of the plurality of second domains and said reroute domain is said one of the plurality of second domains and said first section is a section of the path in said one of the plurality of second domains; and wherein the step of determining said new first section includes:

determining a new section of the path through said one of the plurality of second domains; and wherein the step of determining if the connection can be established includes:

establishing the connection along said new section of the path in said one of the plurality of second domains.

5. The method according to claim 1 wherein said request for detected failure routing indicates rerouting in any of the first domain and said one of the plurality of second domains and said reroute domain is said one of the plurality of second domains and said first section is a section of the path in said one of the plurality of second; and wherein the step of determining said new first section includes:

determining a new section of the path through said one of the plurality of second domains; and wherein the step of determining if the connection can be established includes:

establishing the connection along said new section of the path in said one of the plurality of second domains if the connection can be established; and wherein said second section is the entire path and wherein the step of requesting rerouting includes:

requesting rerouting of the connection along the path in the first domain when the connection along said new section of the path in said one of the plurality of second domains is not established.

6. The method according to claim 1 wherein said request for path optimization indicates path optimization in one of the first domain, one of the plurality of second domains, or any of the first domain and one of the plurality of second domains; and wherein the step of detection said request further includes:

determining if said request for detected failure routing indicates rerouting in the first domain, one of the plurality of second domains or any of the first domain and one of the plurality of second domains.

7. The method according to claim 6 wherein said request for path optimization indicates rerouting in the first domain and said reroute domain is the first domain and said first section of the path is the entire path; and wherein the step of determining said new first section includes:

determining a new path between the originating node and the terminating node in the first domain; and wherein the step of determining if the connection can be established includes:

establishing the connection along said new path in the first domain.

8. The method according to claim 6 wherein said request for path optimization indicates rerouting in one of the plurality of second domains and said reroute domain is said one of the plurality of second domains and said first section is a section of the path in said one of the plurality of second domains; and wherein the step of determining said new first section includes:

determining a new section of the path through said one of the plurality of second domains; and wherein the step of determining if the connection can be established includes:

establishing the connection along said new section of the path in said one of the plurality of second domains.

9. The method according to claim 6 wherein said request for path optimization indicates rerouting in any of the first domain and said one of the plurality of second domains and said reroute domain is the first domain and said first section is the entire path; and wherein the step of determining said new first section includes:

determining a new path between the originating node and the terminating node in the first domain; and wherein the step of determining if the connection can be established includes:

establishing the connection along said new path in the first domain if the connection can be established; and wherein said second section is a section of the path in said one of the plurality of second domains and wherein the step of requesting rerouting includes:

requesting rerouting of the connection along said second section of the path in said one of the plurality of second domains when the connection along said new path in the first domain is not established.

10. The method according to claim 1 wherein said request is associated with an identifier information element; and wherein the step of determining said new first section includes:

determining said new first section for the path in said reroute domains in accordance with said identifier information element.

11. The method according to claim 10 wherein:

along the path, the furthest downstream in each of said plurality of second domains behave as local routing and the furthest upstream nodes in each of said plurality of second domains behave as local rendezvous nodes;

along the path, the furthest downstream of said plurality of second domains is a first second domains and the further upstream of said plurality of second domains is a second second domain; and a local rerouting node in said first second domain behaves as a global rerouting node and a local rendezvous node in said second second domain behaves as a global rendezvous node; and wherein the step of determining said new first section is performed by a local rerouting node and a local rendezvous node from one of said plurality of second domains and the global rerouting node and global rendezvous node, the step of detecting said request including:

detecting said identifier information element associated with said subset of said plurality of interconnected nodes from one of said plurality of second domains and other nodes from said plurality of interconnected nodes.

12. The method according to claim 10 further including:

providing information elements in accordance with Domain-Based Rerouting (DBR) standards of a Private Network-Network Interface network; and wherein each of said plurality of second domains has boundaries determined with reference to a selected portion of the DBR information elements and the connection is established with reference to another selected portion of the DBR information elements.

13. A method of rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said method comprising:

detecting an event associated with the path and the connection;

generating a reroute request upon detection of said event said request being associated with an identifier information element;

determining a new path for the connection in accordance with said identifier element; and establishing the new path for the connection wherein the originating node and the terminating node remain connected; and along the path, the furthest downstream in each of said plurality of second domains behave as local routing and the furthest upstream nodes in each of said plurality of second domains behave as local rendezvous nodes;

along the path, the furthest downstream of said plurality of second domains is a first second domains and the further upstream of said plurality of second domains is a second second domain; and a local rerouting node in said first second domain behaves as a global rerouting node and a local rendezvous node in said second second domain behaves as a global rendezvous node; and the step of determining said new first section is performed by a local rerouting node and a local rendezvous node from one of said plurality of second domains and the global rerouting node and global rendezvous node, the step of detecting said request including:

detecting said identifier information element associated with said subset of said plurality of interconnected nodes from one of said plurality of second domains and other nodes from said plurality of interconnected nodes.

14. The method according to claim 13 wherein the step of establishing said new path includes:

establishing said new path between local rerouting nodes and local rendezvous nodes of different ones of said plurality of second domains.

15. The method according to claim 13 wherein said event is a link failure and wherein the step of generating said reroute request includes:

generating a connection recovery request indicating that said event is a link failure.

16. The method according to claim 15 wherein the step of generating said reroute request includes:

generating a code identifying a rerouting type, said rerouting type being either intra-domain or inter-domain.

17. The method according to claim 16 wherein the step of determining said new path includes:

determining said new path inside one of said plurality of second domains upon receipt of said code identifying a rerouting type of intra-domain.

18. The method according to claim 16 wherein the step of determining said new path includes:

determining said new path between one of said plurality of interconnected nodes in one of said plurality of second domains and another of said plurality of interconnected nodes in another of said plurality of second domains upon receipt of said code identifying a rerouting type of inter-domain.

19. The method according to claim 13 wherein said event is path optimization and wherein the step of generating said reroute request includes:

generating a path optimization request indicating that said event is path optimization.

20. The method according to claim 19 wherein the step of generating said reroute request includes:

generating a code identifying a path optimization type, said path optimization type being either intra-domain or inter-domain.

21. The method according to claim 20 wherein the step of determining said new path includes:

determining said new path inside one of said plurality of second domains upon receipt of said code identifying a path optimization type of intra-domain.

22. The method according to claim 20 wherein the step of determining said new path includes:

determining said new path between one of said plurality of interconnected nodes in one of said plurality of second domains and another of said plurality of interconnected nodes in another of said plurality of second domains upon receipt of said code identifying a path optimization type of inter-domain.

23. The method according to claim 13 further comprising: providing information elements in accordance with Domain-Based Rerouting (DBR) standards of a Private Network-Network Interface network; and wherein each of said plurality of second domains has boundaries determined with reference to a selected portion of the DBR information elements and the connection is established with reference to another selected portion of the DBR information elements.

24. A system for rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said system comprising:

means for detecting a request to reroute a first section of the path of the connection in a reroute domain, wherein said reroute domain is one of either the first domain or one of the plurality of second domains;

means for determining a new first section for the path in said reroute domain;

means for determining if the connection can be established along the path through said new first section; and means for requesting rerouting of the connection along a second section of the path in the other of either the first domain or one of the plurality of second domains when the connection along the path through said new first section is not established;

said means for detecting said request includes: means for determining if said request is for detected failure rerouting or for path optimization;

said request for detected failure routing is based on a failure in the network and indicates rerouting in one of the first domain, one of the plurality of second domains, or any of the first domain and one of the plurality of second domains and said request for path optimization indicates path optimization in one of the first domain, one of the plurality of second domains, or any of the first domain and one of the plurality of second domains;

said means for detecting said request further includes: means for determining if said request indicates rerouting in the first domain, one of the plurality of second domains or any of the first domain and one of the plurality of second domains.

25. The system according to claim 24 wherein said means for determining if the connection can be established includes:

means for establishing the connection along the path through said new first section if the connection can be established wherein the originating node and the terminating node remain connected.

26. The system according to claim 24 wherein said means for determining said new first section includes:

means for determining a new path between the originating node and the terminating node in the first domain when said request indicates rerouting the first domain or said request is for path optimization and indicates rerouting in any of the first domain and said one of the plurality of second domains;

and wherein said means for determining if the connection can be established includes:

means for establishing the connection along said new path in the first domain when said request indicates rerouting in the first domain or said request is for path optimization and indicates rerouting in any of the first domain and said one of the plurality of second domains.

27. The system according to claim 26 wherein said means for requesting rerouting includes:

means for requesting rerouting of the connection along said second section of the path in said one of the plurality of second domains when the connection along said new path in the first domain is not established when said request for path optimization indicates rerouting in any of the first domain and said one of the plurality of second domains.

28. The system according to claim 24 wherein said means for determining said new first section includes:

means for determining a new section of the path through said one of the plurality of second domains when said request indicates rerouting in one of the plurality of second domains or said request is for detected failure routing and indicates rerouting in any of the first domain and said one of the plurality of second domains; and wherein said means for determining if the connection can be established includes:

means for establishing the connection along said new section of the path in said one of the plurality of second domains when said request indicates rerouting in one of the plurality of second domains or said request is for detected failure routing and indicates rerouting in any of the first domain and said one of the plurality of second domains.

29. The system according to claim 28 wherein said means for requesting rerouting includes:

means for requesting rerouting of the connection along the path in the first domain when the connection along said new section of the path in said one of the plurality of second domains is not established when said request is for detected failure routing indicates rerouting in any of the first domain and said one of the plurality of second domains.

30. The system according to claim 24 wherein said request is associated with an identifier information element; and wherein said means for determining said new first section includes:

means for determining said new first section for the path in said reroute domains in accordance with said identifier information element.

31. A system for rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said system comprising:

an event detection mechanism for detecting a request to reroute a first section of the path of the connection in a reroute domain, said reroute domain is one of either the first domain or one of the plurality of second domains;

a domain routing determination mechanism for determining a new first section for the path in said reroute domain;

a connection control mechanism for determining if the connection can be established along the path through said new first section;

a fail action mechanism for requesting rerouting of the connection along a second section of the path in the other of either the first domain or one of the plurality of second domains when the connection along the path through said new first section is not established;

said event detection mechanism includes: a request cause detection mechanism for determining if said request is for detected failure rerouting or for path optimization;

said request for detected failure routing is based on a failure in the network and indicates rerouting in one of the first domain, one of the plurality of second domains, or any of the first domain and one of the plurality of second domains and said request for path optimization indicates path optimization in one of the first domain, one of the plurality of second domains, or any of the first domain and one of the plurality of second domains;

said event detection mechanism further includes:

a request domain detection mechanism for determining if said indicates rerouting in the first domain, one of the plurality of second domains or any of the first domain and one of the plurality of second domains.

32. The system according to claim 31 wherein said connection control mechanism if the connection can be established includes:

a connection establishment mechanism for establishing the connection along the path through said new first section if the connection can be established wherein the originating node and the terminating node remain connected.

33. The system according to claim 31 wherein said domain routing determination mechanism includes:

a first domain path determination mechanism for determining said new path between the originating node and the terminating node in the first domain when said request indicates rerouting the first domain or said request is for path optimization and indicates rerouting in any of the first domain; and wherein said connection control mechanism includes:

a first domain connection mechanism for establishing the connection along said new path in the first domain when said request indicates rerouting in the first domain or said request is for path optimization and indicates rerouting in any of the first domain.

34. The system according to claim 33 wherein said fail action mechanism includes:

a second domain fail action mechanism for requesting rerouting of the connection along said second section of the path in said one of the plurality of second domains when the connection along said new path in the first domain is not established when said request for path optimization indicates rerouting in any of the first domain and said one of the plurality of second domains.

35. The system according to claim 31 wherein said domain routing determination mechanism includes:

a second domain determination mechanism for determining a new section of the path through said one of the plurality of second domains when said request indicates rerouting in one of the plurality of second domains or said request is for detected failure routing and indicates rerouting in any of the first domain and said one of the plurality of second domains; and wherein said connection control mechanism includes:

a second domain connection mechanism for establishing the connection along said new section of the path in said one of the plurality of second domains when said request indicates rerouting in one of the plurality of second domains or said request is for detected failure routing and indicates rerouting in any of the first domain and said one of the plurality of second domains.

36. The system according to claim 35 wherein said fail action mechanism includes:

a first domain fail action mechanism for requesting rerouting of the connection along the path in the first domain when the connection along said new section of the path in said one of the plurality of second domains is not established when said request is for detected failure routing indicates rerouting in any of the first domain and said one of the plurality of second domains.

37. The system according to claim 31 wherein said request is associated with an identifier information element; and wherein said domain routing determination mechanism includes:

an information element routing mechanism for determining said new first section for the path in said reroute domains in accordance with said identifier information element.

38. A computer readable medium having stored thereon computer-executable instructions for rerouting a connection in a network having plurality of interconnected nodes defining a first domain, the connection being along a path between an originating node and a terminating node from the plurality of interconnected nodes, the first domain having a plurality of second domains defined by a subset of said plurality of interconnected nodes, said computer-executable instructions comprising:

detecting a request to reroute a first section of the path of the connection in a reroute domain, said reroute domain is one of either the first domain or one of the plurality of second domains;

determining a new first section for the path in said reroute domain;

determining if the connection can be established along the path through said new first section; and requesting rerouting of the connection along a second section of the path in the other of either the first domain or one of the plurality of second domains when the connection along the path through said new first section is not established;

the computer-executable instructions for detecting said request includes:

determining if said request is a request for detected failure rerouting or a request for path optimization;

said request for detected failure routing is based on a failure in the network and indicates rerouting in one of the first domain, one of the plurality of second domains, or any of the first domain and one of the plurality of second domains;

the computer-executable instructions for detecting said request further includes:

determining if said request for detected failure routing indicates rerouting in the first domain, one of the plurality of second domains or any of the first domain and one of the plurality of second domains.

39. The computer-readable medium according to claim 38 wherein the computer-executable instructions for determining if the connection can be established includes:

establishing the connection along the path through said new first section if the connection cab be established wherein the originating node and the terminating node remain connected.

40. The computer-readable medium according to claim 38 wherein said request for detected failure routing indicates rerouting in the first domain and said reroute domain is the first domain and said first section of the path is the entire path; and wherein the computer-executable instructions for determining said new first section includes:

determining a new path between the originating node and the terminating node in the first domain; and wherein the computer-executable instructions for determining if the connection can be established includes:

establishing the connection along said new path in the first domain.

41. The computer-readable medium according to claim 38 wherein said request for detected failure routing indicates rerouting in one of the plurality of second domains and said reroute domain is said one of the plurality of second domains and said first section is a section of the path in said one of the plurality of second domains; and wherein the computer-executable instructions for determining said new first section includes:

determining a new section of the path through said one of the plurality of second domains; and wherein the computer-executable instructions for determining if the connection can be established includes:
  establishing the connection along said new section of the path in said one of the plurality of second domains.

42. The computer-readable medium according to claim 38 wherein said request for detected failure routing indicates rerouting in any of the first domain and said one of the plurality of second domains and said reroute domain is said one of the plurality of second domains and said first section is a section of the path in said one of the plurality of second; and wherein the computer-executable instructions for determining said new first section includes:

determining a new section of the path through said one of the plurality of second domains; and wherein the computer-executable instructions for determining if the connection can be established includes:
  establishing the connection along said new section of the path in said one of the plurality of second domains if the connection can be established;
and wherein said second section is the entire path and wherein the computer-executable instructions for requesting rerouting includes:
 requesting rerouting of the connection along the path in the first domain when the connection along said new section of the path in said one of the plurality of second domains is not established.

43. The computer-readable medium according to claim 38 wherein said request for path optimization indicates path optimization in one of the first domain, one of the plurality of second domains, or any of the first domain and one of the plurality of second domains; and wherein the computer-executable instructions for detecting said request further includes:

determining if said request for detected failure routing indicates rerouting in the first domain, one of the plurality of second domains or any of the first domain and one of the plurality of second domains.

44. The computer-readable medium according to claim 43 wherein said request for path optimization indicates rerouting in the first domain and said reroute domain is the first domain and said first section of the path is the entire path; and wherein the computer-executable instructions for determining said new first section includes:

determining a new path between the originating node and the terminating node in the first domain; and wherein the computer-executable instructions for determining if the connection can be established includes:
  establishing the connection along said new path in the first domain.

45. The computer-readable medium according to claim 43 wherein said request for path optimization indicates rerouting in one of the plurality of second domains and said reroute domain is said one of the plurality of second domains and said first section is a section of the path in said one of the plurality of second domains; and wherein the computer-executable instructions for determining said new first section includes:

determining a new section of the path through said one of the plurality of second domains; and wherein the computer-executable instructions for determining if the connection can be established includes:
  establishing the connection along said new section of the path in said one of the plurality of second domains.

46. The computer-readable medium according to claim 43 wherein said request for path optimization indicates rerouting in any of the first domain and said one of the plurality of second domains and said reroute domain is the first domain and said first section is the entire path; and wherein the computer-executable instructions for determining said new first section includes:

determining a new path between the originating node and the terminating node in the first domain; and wherein the computer-executable instructions for determining if the connection can be established includes:
  establishing the connection along said new path in the first domain if the connection can be established; and wherein said second section is a section of the path in said one of the plurality of second domains and wherein the computer-executable instructions for requesting rerouting includes:
 requesting rerouting of the connection along said second section of the path in said one of the plurality of second domains when the connection along said new path in the first domain is not established.

47. The computer-readable medium according to claim 38 wherein said request is associated with an identifier information element; and wherein the computer-executable instructions for determining said new first section includes:

determining said new first section for the path in said reroute domains in accordance with said identifier information element.

48. The computer-readable medium according to claim 47 wherein:

along the path, the furthest downstream in each of said plurality of second domains behave as local routing and the furthest upstream nodes in each of said plurality of second domains behave as local rendezvous nodes;
 along the path, the furthest downstream of said plurality of second domains is a first second domains and the further upstream of said plurality of second domains is a second second domain; and
 a local rerouting node in said first second domain behaves as a global rerouting node and a local rendezvous node in said second second domain behaves as a global rendezvous node; and wherein the computer-executable instructions for determining said new first section is performed by a local rerouting node and a local rendezvous node from one of said plurality of second domains and the global rerouting node and global rendezvous node, the computer-executable instructions for detecting said request including:
 detecting said identifier information element associated with said subset of said plurality of interconnected nodes from one of said plurality of second domains and other nodes from said plurality of interconnected nodes.

49. The computer-readable medium according to claim 47 further including:

providing information elements in accordance with Domain-Based Rerouting (DBR) standards of a Private Network-Network Interface network; and wherein each of said plurality of second domains has boundaries determined with reference to a selected portion of the DBR information elements and the connection is established with reference to another selected portion of the DBR information elements.

\* \* \* \* \*